(12) United States Patent
Holder

(10) Patent No.: US 6,562,748 B2
(45) Date of Patent: May 13, 2003

(54) PROCESS FOR THE MANUFACTURE OF CHEMICAL ABSORBENTS AND CHEMICAL ABSORBENT FORMULATIONS

(75) Inventor: Michael John Holder, Oxfordshire (GB)

(73) Assignee: Intersurgical Limited (GB)

( * ) Notice: Subject to any disclaimer, the term of this patent is extended or adjusted under 35 U.S.C. 154(b) by 0 days.

(21) Appl. No.: 09/284,400

(22) PCT Filed: Oct. 16, 1997

(86) PCT No.: PCT/GB97/02847

§ 371 (c)(1),
(2), (4) Date: Jul. 2, 1999

(87) PCT Pub. No.: WO98/17385

PCT Pub. Date: Apr. 30, 1998

(65) Prior Publication Data

US 2002/0072466 A1 Jun. 13, 2002

(30) Foreign Application Priority Data

Oct. 17, 1996 (GB) .............................................. 9621620

(51) Int. Cl.⁷ ................................................. B01J 29/00
(52) U.S. Cl. ........................... 502/64; 502/60; 502/400; 502/439
(58) Field of Search ........................... 502/60, 62, 400, 502/439, 64

(56) References Cited

U.S. PATENT DOCUMENTS

| 3,857,144 A | * 12/1974 | Bustin ........................ 28/72 R |
| 4,065,289 A | * 12/1977 | Judd .............................. 71/82 |
| 4,604,372 A | * 8/1986 | Morishita et al. .............. 502/62 |
| 5,047,255 A | * 9/1991 | Fujita ........................... 426/418 |
| 5,176,751 A | * 1/1993 | Findley ....................... 106/502 |
| 5,484,533 A | * 1/1996 | Crawford et al. |
| 5,529,799 A | * 6/1996 | Bornhorst et al. ........... 426/549 |

FOREIGN PATENT DOCUMENTS

| JP | 6-144049 | * 11/1981 |
| JP | 58-84039 | * 5/1983 |
| JP | 58-177137 | * 10/1983 |
| JP | 61-203969 | * 9/1986 |
| JP | 4-94723 | * 3/1992 |
| JP | 6-79138 | * 3/1994 |

* cited by examiner

*Primary Examiner*—Tom Dunn
*Assistant Examiner*—Christina Ilebrando
(74) *Attorney, Agent, or Firm*—Nixon Peabody LLP

(57) ABSTRACT

A soda lime formulation comprises calcium hydroxide in admixture with sodium hydroxide and potassium hydroxide and water, and further comprises a zeolite such as sodium aluminium silicate. The formulation has improved mechanical strength and may be prepared in granular form by mixing its constituents with water to form a paste and passing the paste between a pair of rollers having hemispherical depressions therein.

27 Claims, 1 Drawing Sheet

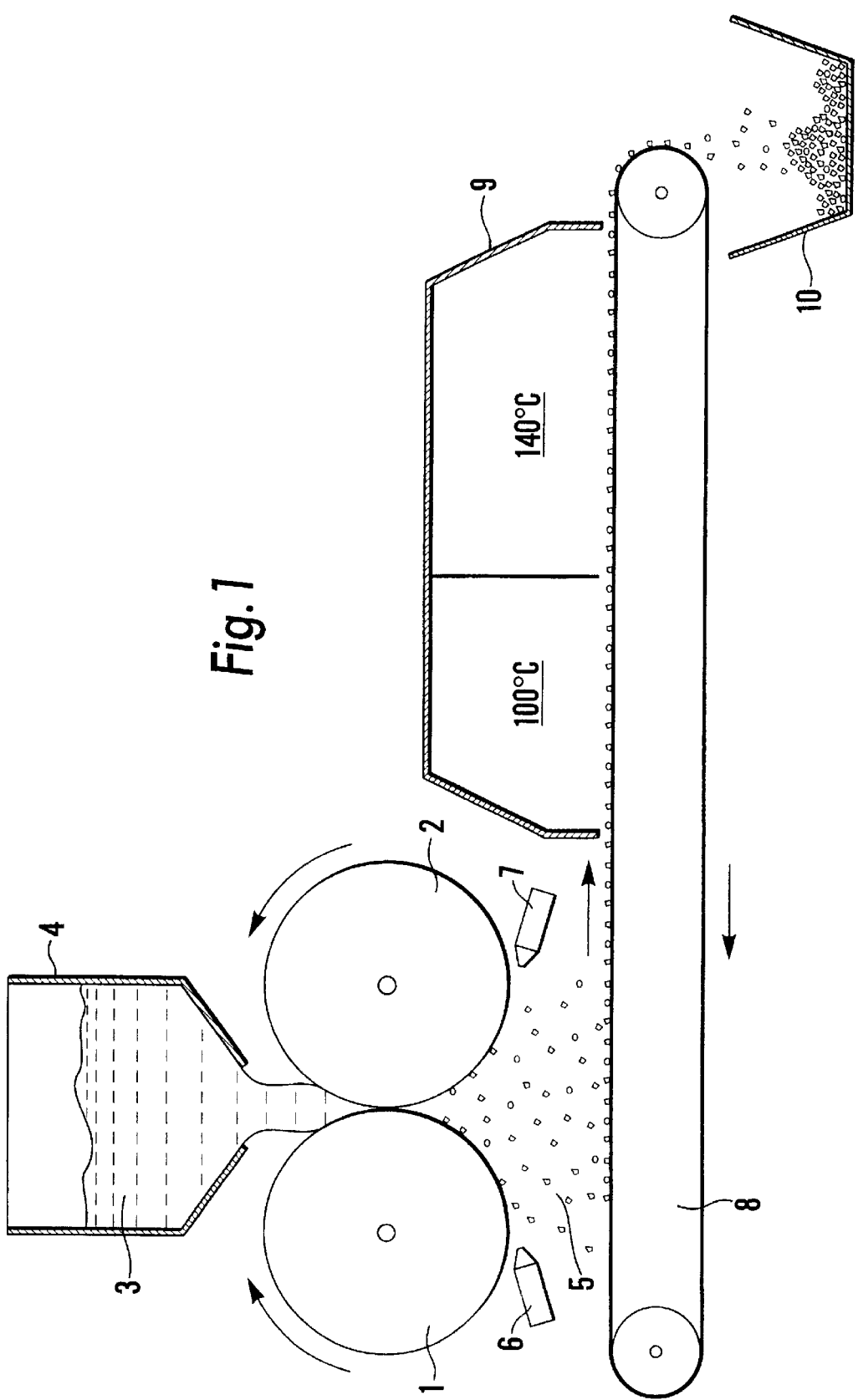

PROCESS FOR THE MANUFACTURE OF CHEMICAL ABSORBENTS AND CHEMICAL ABSORBENT FORMULATIONS

This invention relates to a process for the manufacture of chemical absorbents, and to novel chemical absorbent formulations.

Chemical absorbents are used to remove one or more molecular species, for example to remove specific molecular species from mixtures of gases. Soda lime is one such chemical absorbent and is widely used to absorb carbon dioxide, for instance in anaesthetic breathing systems and other applications involving air which is to be breathed.

In order to make chemically active soda lime, calcium hydroxide is mixed with sodium hydroxide and/or potassium hydroxide to produce a caustic lime mixture containing water. The ratio of components in the caustic lime mixture is 96–98% calcium hydroxide with 2–4% sodium and/or potassium hydroxide. The finished product contains typically 81–87% caustic lime mixture and 13–19% water. In addition, a pH sensitive indicator dye is normally present to give a visual indication of the extent of usage and exhaustion. This indicator dye is present in the caustic lime mixture at very low levels, typically 0.01–0.1%.

To varying degrees, all known soda lime formulations contain dust and fine particles generated as a result of the friability and breakdown of the finished product. The presence of such dust is undesirable, particularly when the product is intended for use in anaesthetic (or other) breathing systems since the fine particles may be inhaled.

There has now been devised a process for the manufacture of chemical absorbents which overcomes or substantially mitigates the above problem.

According to the invention, a process for the manufacture of a chemical absorbent in solid, granular form comprises the steps of a) mixing the components of the chemical absorbent with water to form a paste; and b) passing the paste between a pair of counter-rotating, contacting rollers, the rollers having formed therein corresponding substantially hemispherical depressions.

The process according to the invention is advantageous primarily in that the chemical absorbent is formed into substantially spherical granules. Consequently, the granules have no projecting edges or corners which can break off and create dust. The granules are considerably less friable than conventional granules and maintain the integrity of their shape throughout normal use.

The surface and rotation of the counter-rotating rollers are such that, at the point at which the rollers touch, depressions in the rollers form substantially spherical moulds. Most preferably, the hemispherical depressions are arranged in a hexagonal close-packed array.

Preferably, the direction of rotation of the rollers and the direction in which the paste is fed between them are such that the paste travels downwards, ie movement of the paste between the rollers is assisted by gravity.

As the rollers rotate, the spherical moulds re-open, exposing the moulded paste spheres. It is preferred that means be provided for dislodging the spheres from the rollers. Most preferably, such means is an air knife positioned adjacent each roller to generate a tangential blade of high velocity and energetic air.

Spherical solid granules of a chemical absorbent formulation are believed to be novel, and represent a further aspect of the present invention.

The process according to the invention may be utilised to produce spherical granules of a wide range of chemical absorbent formulations. However, it has been found to be particularly useful in relation to soda lime formulations. Furthermore, novel soda lime formulations have been developed which demonstrate improved mechanical strength and are especially well suited to manufacture by the process of the invention.

Thus, according to another aspect of the invention there is provided a soda lime formulation comprising a major proportion of calcium hydroxide in admixture with a minor proportion of sodium hydroxide and/or potassium hydroxide and water, the formulation further comprising a zeolite.

Various forms of zeolite, eg zeolites containing sodium, calcium, barium, strontium or potassium, may be utilised. The presently preferred zeolite is sodium aluminium silicate.

The zeolite is preferably present in the formulation to a level of between 0.1 and 10% w/w, more preferably 2% to 6% w/w.

The invention will now be described in greater detail, by way of illustration only, with reference to the manufacture of spheres of the following, presently most preferred, soda lime formulation:

| | |
|---|---|
| Calcium hydroxide | 77 parts by weight |
| Sodium hydroxide | 3 parts by weight |
| Sodium aluminium silicate | 4 parts by weight |
| Water | 16 parts by weight |
| pH sensitive indicator dye | 0.03 parts by weight. |

The required quantities of calcium hydroxide, sodium aluminium silicate and indicator dye (all in the form of fine powders) are mixed to form a homogeneous powder mix.

The required amount of sodium hydroxide and water are mixed to form a homogeneous caustic solution.

The caustic solution is added to the powder mix. Mixing then takes place to form a stiff paste.

Before the above paste is processed it has been found to be beneficial to allow a dwell time of 20 to 60 minutes, during which the paste hardens to a stiffer consistency.

The paste is then loaded into a processor which is shown schematically in FIG. 1.

The processor comprises two counter rotating and touching rollers 1,2. The direction of rotation of the rollers 1,2 at the point where they touch is such that the surface of both rollers 1,2 has a downward motion.

Each roller 1,2 is profiled with hemispherical cavities, each cavity being of the same diameter. Depending on the product to be made, this my be 3, 3.5 or 4 mm. The hemispherical cavities are arranged in a hexagonal close packed arrangement.

The profiled surface and relative movement of the two touching rollers 1,2 are synchronised such that at the point at which the surfaces of the two rollers 1,2 meet, a row of completely spherical moulds are created from the two facing rows of hemispheres. The speed of rotation of the two rollers 1,2 is synchronised and can be varied between 0 and 30 revolutions per minute.

Paste 3 is fed in lumps into a feed hopper 4 mounted on top of the processor such that the paste 3 is resting on the downwardly rotating surfaces of the rollers 1,2. In an alternative arrangement, the paste is formed into a sheet which is fed between the rollers.

The motion of the rollers draws paste down between them at the point where they touch. Soda lime paste is thus squeezed and forced to fill the spherical moulds as they form.

As the rollers rotate, the spherical cavities re-open exposing a row of moulded paste spheres 5. These spheres 5 generally do not drop out of the processor under their own weight, instead they stick inside one or the other of the two hemispherical cavities from which they were moulded. There is no factor influencing which roller cavity the moulded spheres 5 stick to and so the result is that both rollers as they rotate from the under side have half of their profiled pits empty while the other half are full of moulded spheres.

The profiled cavities on the surface of the rollers must be emptied of the moulded paste spheres 5 in order that they are available to take up more paste the next time around. Therefore, an ejection mechanism is necessary to remove the moulded spheres 5 from the cavities.

Air knives 6,7 are mounted adjacent each roller 1,2 such that a blade of high velocity and energetic air is directed at a tangent to the surface of the rollers 1,2 down their entire length.

As the rollers 1,2 rotate, the rows of cavities filled with moulded spheres 5 come into line with the blade of air which hits the side of the moulded spheres 5 thus ejecting them from the cavities.

A conveyor belt 8 starting a sufficient distance behind the processor passes under it, collecting spheres 5 as they drop. The moulded spheres 5 travel along the conveyor and into a continuous belt oven 9.

The first drying stage is a gentle drying at around 100° C. during which the majority of the water is removed from the product. This low temperature stage has two beneficial effects. Firstly, it is believed that it prevents rapid drying which could create stress within the structure, reducing the subsequent physical strength of the product. Secondly, it is believed that the low temperature prevents migration of sodium hydroxide to the surface of the spheres 5 while it is still in solution. This would create an outer layer of high alkalinity but an interior of low alkalinity and poor activity.

The second drying stage is at an elevated temperature of around 140° C. In this stage the product is completely dried to less than 1% water. This level of dryness is important as it allows for bonding to take place between microscopic lime particles within the soda lime spheres 5 (it is believed that as the dissolved ions come out of solution they form bonds between the lime particles).

On exiting the oven 9, the dried spheres 5 are tipped from the conveyor belt 8 and are collected in a suitable receptacle 10.

During the formation of soda lime spheres 5 by the invented process, some of the spheres are found to possess a slight "moulding seam" around the circumference. Although the dusting of this finished product is already low this "moulding seam" may present a region of increased friability on the soda lime sphere. It has been found to be beneficial to include a de-dusting stage in the production process.

The de-duster comprises a rotating cylinder made from perforated steel sheet. The size and pitch of the perforations are such that only fine particles and dust are allowed to fall through while the spheres remain in the cylinder. The speed of rotation of the de-dusting cylinder is between 30 and 60 revolutions per minute.

The completely dried soda lime spheres are introduced into the de-duster. As the spheres begin to tumble they settle into a stable flowing cyclic motion. As they do so, the spheres roll against one another creating an abrasive affect which causes the pieces of "flash" or moulding "seam" to be broken off. After a sufficient time the spheres are smoothed while the generated dust falls through the perforations and is thus separated from the product. The resulting product possess a significantly reduced friability since any irregularities have been removed.

In order for soda lime to be chemically active (able to absorb $CO_2$) the final product must contain a level of water between 13 and 19% (16% in the above formulation).

During the drying process it is necessary to completely dry the product in order to create the physical strength. Therefore, there is insufficient moisture present for $CO_2$ activity and the necessary water must be added back into the product to achieve this.

To achieve the required end product moisture content of 16% by weight, the necessary quantity of water to "wet back" the de-dusted product is calculated. This water is then added to the dry product and the mixture is mechanically agitated for a sufficient time to disperse the water. The soda lime is then sealed in an air tight container until complete equilibrium of the moisture has taken place.

The product may contain partially formed spheres and/or fine particles created during the wetting back process. In order to remove these, the soda lime is sieved over a suitable screen before packing.

What is claimed is:

1. A soda lime formulation consisting of a major proportion of calcium hydroxide in admixture with a minor proportion of sodium hydroxide and/or potassium hydroxide, water, and between 0.1 and 10% w/w zeolite.

2. A formulation as claimed in claim 1, wherein the zeolite is sodium aluminium silicate.

3. A formulation as claimed in claim 1, in the form of spherical solid granules.

4. A formulation as claimed in claim 1, wherein the water content ranges from 13 to 19% w/w.

5. A soda lime formulation as claimed in claim 1, wherein calcium hydroxide in the admixture is present in 96 to 98 parts, sodium hydroxide and/or potassium hydroxide in the admixture is present in 2 to 4 parts, and the water content ranges from 13 to 19% w/w.

6. A soda lime formulation as claimed in claim 1, wherein the zeolite content ranges from 2 to 6% w/w.

7. A process for the manufacture of a chemical absorbent in solid, granular form comprising the steps of
   a) mixing the components of the chemical absorbent with water to form a paste; and
   b) passing the paste between a pair of counter-rotating, contacting rollers, the rollers having formed therein corresponding substantially hemispherical depressions, and the rollers being synchronized such that at the point at which the surfaces of the rollers meet spherical molds are created from the corresponding hemispherical depressions.

8. A process as claimed in claim 7, wherein the hemispherical depressions are arranged in a hexagonal close-packed array.

9. A process as claimed in claim 7, wherein the direction of rotation of the rollers and the direction in which the paste is fed between them are such that the paste travels downwards.

10. A process as claimed in claim 7, wherein means are provided for dislodging the granules of chemical absorbent from the rollers.

11. A process as claimed in claim 10 wherein said means is an air knife positioned adjacent each roller to generate a tangential blade of high velocity and energetic air.

12. A process as claimed in claim 7, which is a process for the manufacture of a soda lime formulation wherein the soda lime formulation comprising a major proportion of calcium hydroxide in admixture with a minor proportion of sodium hydroxide and/or potassium hydroxide, water, and between 0.1 and 10% w/w zeolite, said process comprising the further steps of completely drying the granules and then adding water to yield granules with a water content of 13–19%.

13. A process for the manufacture of a soda lime formulation comprising a major proportion of calcium hydroxide in admixture with a minor proportion of sodium hydroxide and/or potassium hydroxide, water, and between 0.1 and 10% w/w zeolite in solid, granular form comprising the steps of
   a) mixing the components of the soda lime formulation to form a paste; and
   b) passing the paste between a pair of counter-rotating rollers, the rollers having formed therein corresponding substantially hemispherical depressions, and the rollers being synchronized such that at the point at which the surfaces of the rollers meet spherical moulds are created from the corresponding hemispherical depressions.

14. A process for the manufacture of a soda lime formulation comprising a major proportion of calcium hydroxide in admixture with a minor proportion of sodium hydroxide and/or potassium hydroxide, water, and between 0.1 and 10% w/w zeolite in solid, granular form comprising the steps of
   a) mixing the components of the soda lime formulation to form a paste; and
   b) passing the paste between a pair of counter-rotating rollers, the rollers having formed therein corresponding substantially hemispherical depressions, and the rollers being synchronized such that at the point at which the surfaces of the rollers meet spherical moulds are created from the corresponding hemispherical depressions.
   c) dislodging substantially spherical granules of said paste from said rollers;
   d) drying said granules; and
   e) adding water to said granules so as to yield granules with a water content of 13 to 19% w/w.

15. A soda lime formulation consisting of a major proportion of calcium hydroxide in admixture with a minor proportion of sodium hydroxide and/or potassium hydroxide, water, zeolite, and a pH sensitive indicator dye, said formulation being effective to absorb carbon dioxide from air.

16. A substantially dust-free anesthetic breathing system comprising a major proportion of calcium hydroxide in admixture with a minor proportion of sodium hydroxide and/or potassium hydroxide, water, zeolite, and a pH sensitive indicator dye.

17. A substantially dust-free anesthetic breathing system as claimed in claim 16, wherein the zeolite content ranges from 0.1 to 10% w/w.

18. A substantially dust-free anesthetic breathing system as claimed in claim 17, wherein the zeolite content ranges from 2 to 6% w/w.

19. A substantially dust-free anesthetic breathing system as claimed in claim 16, wherein the zeolite is sodium aluminum silicate.

20. A substantially dust-free anesthetic breathing system as claimed in claim 16, wherein the water content ranges from 13 to 19% w/w.

21. A substantially dust-free anesthetic breathing system as claimed in claim 16, wherein calcium hydroxide in the admixture is present in 96 to 98 parts, sodium hydroxide and/or potassium hydroxide in the admixture is present in 2 to 4 parts, and the water content ranges from 13 to 19% w/w.

22. A substantially dust-free anesthetic breathing system consisting of a major proportion of calcium hydroxide in admixture with a minor proportion of sodium hydroxide and/or potassium hydroxide, water, zeolite, and a pH sensitive indicator dye.

23. A substantially dust-free anesthetic breathing system as claimed in claim 22, wherein the zeolite content ranges from 0.1 to 10% w/w.

24. A substantially dust-free anesthetic breathing system as claimed in claim 23, wherein the zeolite content ranges from 2 to 6% w/w.

25. A substantially dust-free anesthetic breathing system as claimed in claim 22, wherein the zeolite is sodium aluminum silicate.

26. A substantially dust-free anesthetic breathing system as claimed in claim 22, wherein the water content ranges from 13 to 19% w/w.

27. A substantially dust-free anesthetic breathing system as claimed in claim 22, wherein calcium hydroxide in the admixture is present in 96 to 98 parts, sodium hydroxide and/or potassium hydroxide in the admixture is present in 2 to 4 parts, and the water content ranges from 13 to 19% w/w.

* * * * *